United States Patent
Kubo

(10) Patent No.: US 10,613,573 B2
(45) Date of Patent: Apr. 7, 2020

(54) OPERATION DEVICE AND METHOD FOR MANUFACTURING THE SAME

(71) Applicant: KABUSHIKI KAISHA TOKAI RIKA DENKI SEISAKUSHO, Aichi (JP)

(72) Inventor: Yuki Kubo, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 237 days.

(21) Appl. No.: 15/457,320

(22) Filed: Mar. 13, 2017

(65) Prior Publication Data

US 2017/0277217 A1    Sep. 28, 2017

(30) Foreign Application Priority Data

Mar. 23, 2016   (JP) .................................. 2016-058377

(51) Int. Cl.
    *G05G 1/02*    (2006.01)
    *G06F 3/01*    (2006.01)
    (Continued)

(52) U.S. Cl.
    CPC .............. *G05G 1/02* (2013.01); *F16H 25/18* (2013.01); *F16H 57/023* (2013.01); *G05G 5/03* (2013.01);
    (Continued)

(58) Field of Classification Search
    CPC . G06F 3/01; G06F 3/016; F16H 25/18; F16H 57/023; F16H 2057/005;
    (Continued)

(56) References Cited

U.S. PATENT DOCUMENTS

| 1,902,448 A | * | 3/1933 | Horvath | ................. B66F 13/00 |
| | | | | 254/122 |
| 2,679,357 A | * | 5/1954 | Rosenberger | ........... F16H 27/08 |
| | | | | 235/136 |

(Continued)

FOREIGN PATENT DOCUMENTS

| JP | 2014-146148 A | 8/2014 |
| JP | 2015045362 A | 3/2015 |
| JP | 2016018414 A | 2/2016 |

OTHER PUBLICATIONS

European Extended Search Report 17162454.7-1762 dated Aug. 14, 2017.

*Primary Examiner* — Jake Cook
*Assistant Examiner* — T. Scott Fix
(74) *Attorney, Agent, or Firm* — Roberts Calderon Safran & Cole P.C.

(57) ABSTRACT

An operation device includes a main body, a lifting and lowering mechanism unit movably supported with respect to the main body and including a driven portion configured to receive driving force for movement of the lifting and lowering mechanism unit, a driving unit attached to the main body and configured to drive the lifting and lowering mechanism unit by a driving pin provided on a rotation gear. The lifting and lowering mechanism unit includes a groove portion into which the driving pin is accommodated by rotation of the rotation gear when the driving unit is mounted on the main body.

9 Claims, 5 Drawing Sheets

(51) Int. Cl.
*F16H 57/023* (2012.01)
*F16H 25/18* (2006.01)
*G05G 5/03* (2008.04)
*F16H 57/00* (2012.01)

(52) U.S. Cl.
CPC ........ *G06F 3/016* (2013.01); *F16H 2057/005* (2013.01); *F16H 2057/0056* (2013.01)

(58) Field of Classification Search
CPC .. F16H 2057/0056; B66F 11/00; B66F 13/00; B66F 15/00; B66F 19/00; B66F 2700/00; B66F 2700/02; B66F 2700/025; B66F 2700/03; B66F 2700/09
USPC ........ 74/47, 48, 49, 55, 435; 254/14, 15, 16, 254/17; 269/56, 61; 248/128, 157
See application file for complete search history.

(56) References Cited

U.S. PATENT DOCUMENTS

| | | | | |
|---|---|---|---|---|
| 3,442,146 | A * | 5/1969 | Simpson | F16H 27/04 74/435 |
| 5,011,456 | A * | 4/1991 | Kobayashi | G07D 1/00 453/32 |
| 5,768,933 | A * | 6/1998 | Tanner | B27B 19/006 30/218 |
| 6,115,898 | A * | 9/2000 | Sawdon | B25B 5/087 269/233 |
| 7,296,492 | B2 * | 11/2007 | Marine | A63H 3/48 74/396 |
| 8,584,541 | B2 * | 11/2013 | Sokolofsky | B60H 1/00857 74/470 |
| 8,998,038 | B2 * | 4/2015 | Chang | B65D 83/262 222/182 |
| 9,171,566 | B2 * | 10/2015 | Vanderheyden | G11B 15/6751 |
| 2004/0089089 | A1 * | 5/2004 | Stevens | F16H 55/18 74/440 |
| 2012/0260440 | A1 * | 10/2012 | He | F16H 25/18 15/4 |
| 2012/0272759 | A1 * | 11/2012 | Kim | F16H 37/12 74/53 |
| 2012/0312107 | A1 * | 12/2012 | Lestienne | F16H 25/18 74/55 |
| 2013/0264361 | A1 * | 10/2013 | Chang | B65D 83/262 222/504 |
| 2015/0077360 | A1 | 3/2015 | Hirano | |
| 2016/0016493 | A1 * | 1/2016 | Deppe | B60N 2/0232 297/378.12 |

* cited by examiner

OPERATION DEVICE AND METHOD FOR MANUFACTURING THE SAME

The present application is based on Japanese patent application No. 2016-058377 filed on Mar. 23, 2016, the entire contents of which are incorporated herein by reference.

TECHNICAL FIELD

The present invention relates to an operation device and a method for manufacturing the same.

BACKGROUND ART

An operation device has been proposed. The operation device includes an operation detector, a lifting and lowering mechanism unit, a driving unit, and a controller. The operation detector detects operation performed by fingertips and the like. The lifting and lowering mechanism unit allows the operation detector to be lifted and lowered. The driving unit drives the lifting and lowering mechanism unit to vibrate the operation detector. As a result, a tactile sensation is provided. The controller controls current flowing through the driving unit (see Patent Document 1, for example).

In the operation device described in Patent Document 1 above, the operation detector is supported to the main body via the lifting and lowering mechanism unit while the driving unit including a gear mechanism is attached to the main body. The lifting and lowering mechanism unit includes a groove portion having an undercut shape. A protrusion of the driving unit is incorporated into the groove portion. A cam mechanism includes the groove portion of the lifting and lowering mechanism unit and the protrusion of the driving unit. The cam mechanism provides a configuration in which the driving unit drives the protrusion of the driving unit to vibrate the operation detector via the groove portion of the lifting and lowering mechanism unit. As a result, a predetermined tactile sensation is provided.

CITATION LIST

Patent Literature

Patent Document 1: Japanese Unexamined Patent Application Publication No. 2014-146148A

SUMMARY OF INVENTION

Technical Problem

However, the operation device according to Patent Document 1 has a problem in that the lifting and lowering mechanism unit includes the groove portion having an undercut shape, which degrades the workability when the driving unit is incorporated. That is, when the lifting and lowering mechanism unit is incorporated into the main body, and the protrusion of the driving unit is incorporated into the groove portion having an undercut shape (U-like shape) of the lifting and lowering mechanism unit, these components need to be diagonally incorporated, which results in uncertainty in the operation and difficulty in the incorporation process.

It is an object of the present invention to provide an operation device that has excellent workability during installation of the driving unit into a lifting and lowering mechanism unit, as well as a method for manufacturing the operation device.

Solution to Problem

[1] According to an embodiment of the invention, an operation device is provided that comprises:
a main body;
a lifting and lowering mechanism unit movably supported with respect to the main body and comprising a driven portion configured to receive driving force for movement of the lifting and lowering mechanism unit;
a driving unit attached to the main body and configured to drive the lifting and lowering mechanism unit by a driving pin provided on a rotation gear,
wherein the lifting and lowering mechanism unit comprises a groove portion into which the driving pin is accommodated by rotation of the rotation gear when the driving unit is mounted on the main body.

[2] The operation device described in [1] above may be configured such that the main body includes a guide portion configured to guide the driving unit and allow the driving pin to move linearly in a linear movement direction with respect to the lifting and lowering mechanism unit when the driving unit is mounted into the main body.

[3] The operation device described in [1] or [2] above may be configured such that the groove portion comprises an edge with which the driving pin comes into contact when the driving pin moves in a linear movement direction.

[4] The operation device described in any one of [1] to [3] above may be configured such that the driving pin is configured to be biased to move along the groove portion by the rotation gear that is biased to rotate in one direction.

[5] According to an embodiment of the invention, a method for manufacturing an operation device is provided that comprises:
providing a main body, a lifting and lowering mechanism unit movably supported with respect to the main body and comprising a driven portion configured to receive driving force for movement of the lifting and lowering mechanism unit, and a driving unit attached to the main body and configured to drive the lifting and lowering mechanism unit by a driving pin provided on a rotation gear;
installing the lifting and lowering mechanism unit into the main body;
installing the driving unit by linear movement of the driving unit with respect to the lifting and lowering mechanism unit; and
installing the driving pin by movement of the driving pin along the groove portion of the lifting and lowering mechanism unit by the rotation gear that is biased to rotate in one direction such that the driving pin is accommodated in the groove portion.

[6] The method according to [5] may be configured such that the main body comprises a guide portion configured to guide the driving unit so as to allow the driving unit to move linearly with respect to the lifting and lowering mechanism unit in the installing of the lifting and lowering mechanism unit.

[7] The method according to [5] or [6] may be configured such that the groove portion comprises an edge with which the driving pin comes into contact while moving in a linear movement direction in the installing of the lifting and lowering mechanism unit.

[8] The method according to any one of [5] to [7] may be configured such that the driving pin is accommodated in the groove portion by being rotated opposite to the one direction in which the rotation gear is biased to rotate in the installing of the driving pin.

Advantageous Effects of Invention

According to an embodiment of the invention, an operation device can be provided that has excellent workability during installation of a driving unit into a lifting and lowering mechanism, as well as a method for manufacturing the operation device.

DESCRIPTION OF EMBODIMENTS

Figure 1:
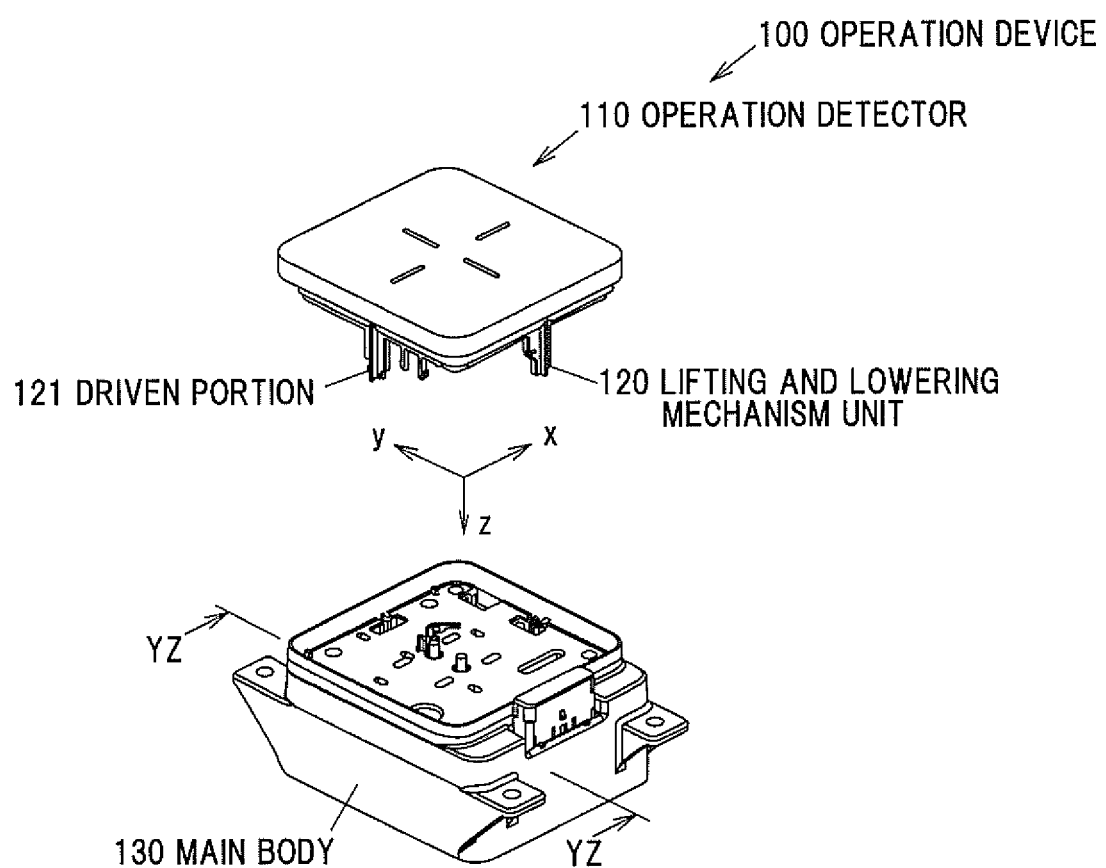
FIG. 1 is a three-dimensional perspective view illustrating an overall configuration of an operation device according to an embodiment of the present invention.
Figure 2:
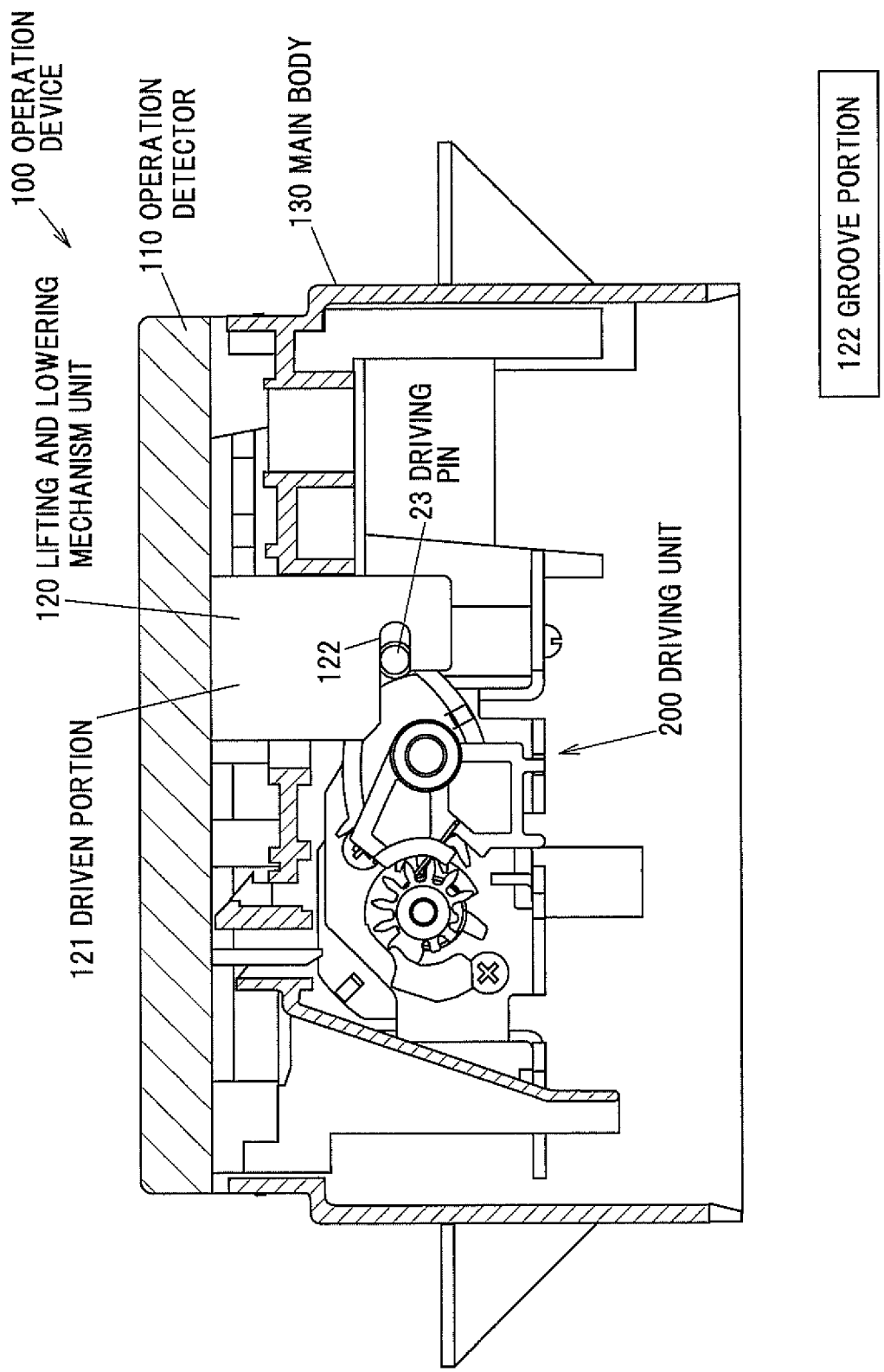
FIG. 2 is a cross-sectional view illustrating a driving unit of the operation device according to the embodiment of the present invention intersected at the YZ-plane of FIG. 1.
Figure 3:
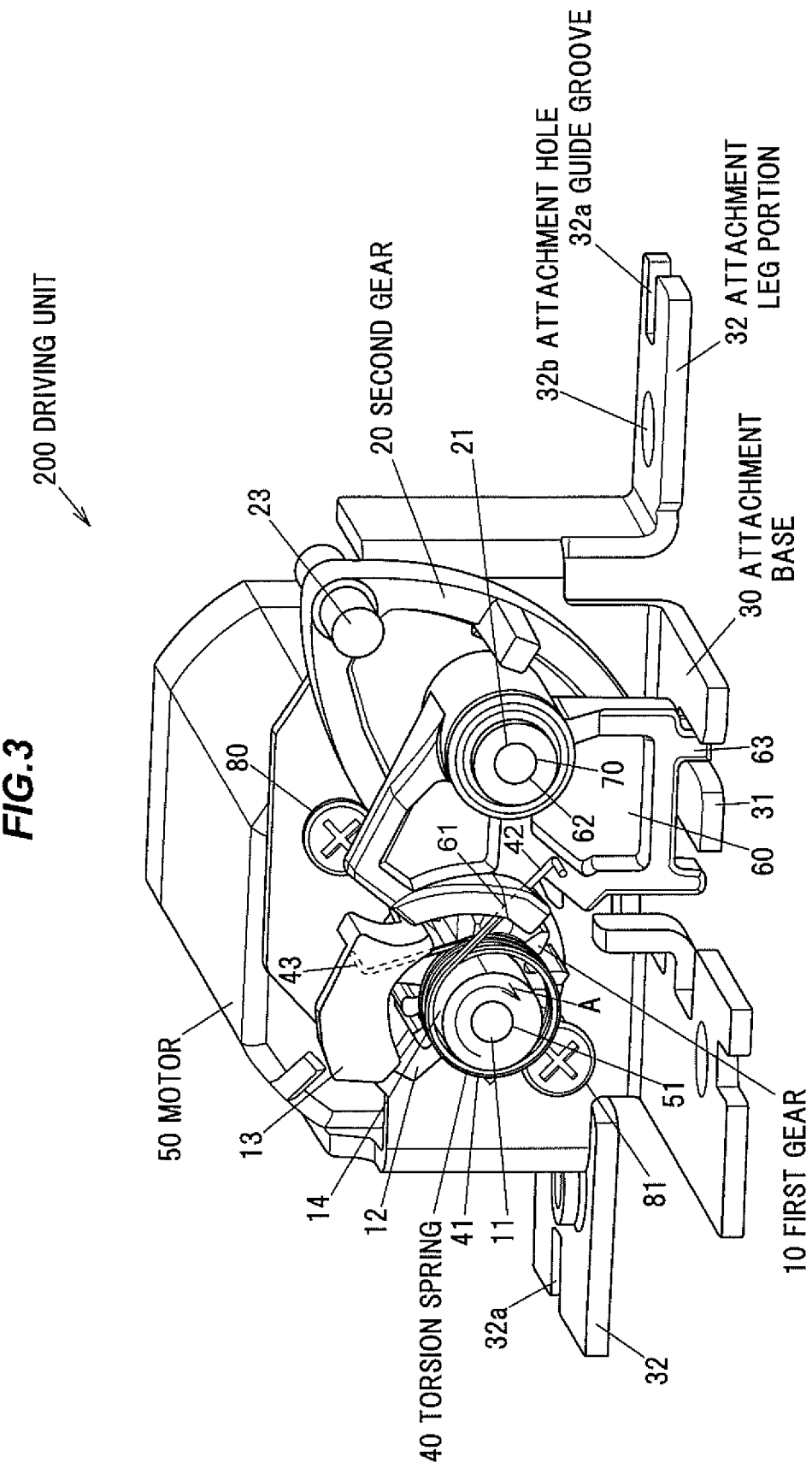
FIG. 3 is a three-dimensional perspective view illustrating the driving unit in entirety according to the embodiment of the present invention.
Figure 4:
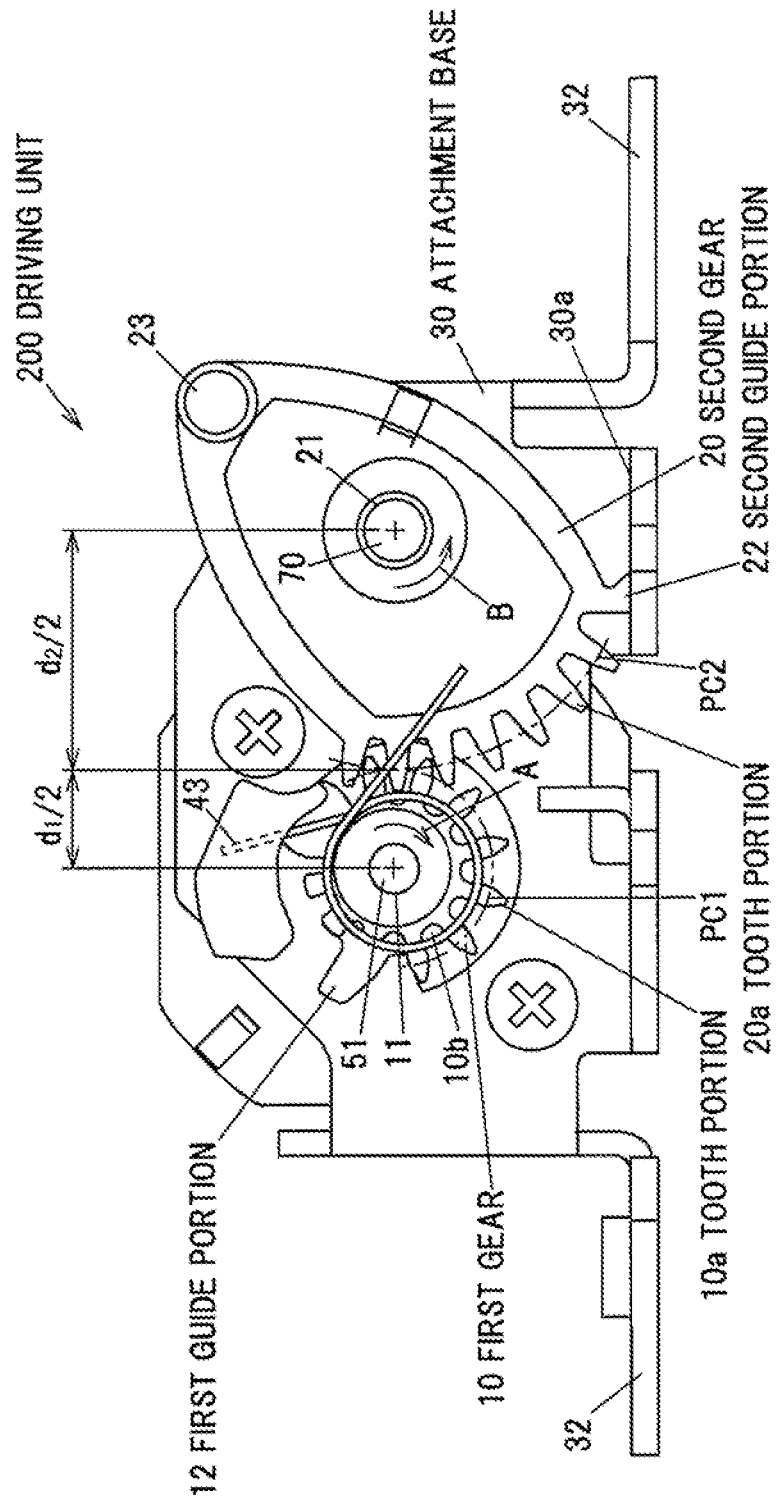
FIG. 4 is a front view illustrating the driving unit according to the embodiment of the present invention viewed from a direction of a gear rotational axis.

FIG. 1 is a three-dimensional perspective view illustrating an overall configuration of an operation device according to an embodiment of the present invention. FIG. 2 is a cross-sectional view illustrating a driving unit of the operation device according to the embodiment of the present invention intersected at the YZ-plane of FIG. 1. FIG. 3 is a three-dimensional perspective view illustrating the driving unit in entirety according to the embodiment of the present invention. FIG. 4 is a front view illustrating the driving unit according to the embodiment of the present invention viewed from a direction of a gear rotational axis. The following describes preferred embodiments of the present invention in detail with reference to the drawings.

Embodiment(s) of Present Invention

Overall Configuration of Operation Device 100

As illustrated in FIGS. 1 and 2, an operation device 100 is configured to include an operation detector 110, a lifting and lowering mechanism unit 120, a driving unit 200, a controller, and the like. The operation detector 110 detects operation performed by fingertips and the like. The lifting and lowering mechanism unit 120 allows the operation detector 110 to be lifted and lowered. The driving unit 200 is configured to drive the lifting and lowering mechanism unit 120 to provide a vibration to the operation detector 110, thereby providing a tactile sensation. The controller controls current flowing through the driving unit 200.

The operation device 100 according to the embodiment of the present invention includes a main body 130, the lifting and lowering mechanism unit 120, and the driving unit 200. The lifting and lowering mechanism unit 120 is movably supported with respect to the main body 130 and includes a driven portion 121 configured to receive driving force for movement of the lifting and lowering mechanism unit 120. The driving unit 200 is attached to the main body 130 and configured to drive the lifting and lowering mechanism unit 120 by a driving pin 23 provided on a rotation gear. The lifting and lowering mechanism unit 120 is generally configured to include a groove portion 122 in which the driving pin 23 is accommodated into the driven portion 121 by rotation of the rotation gear upon the driving unit 200 being mounted in the main body 130.

As illustrated in FIG. 1, the operation detector 110 is a touch sensor that an operator touches with their fingertips and the like. The operation detector 110 is provided with the lifting and lowering mechanism unit 120. The operation detector 110 is movably supported by the lifting and lowering mechanism unit 120 in a vertical direction with respect to the main body 130.

Meanwhile, as illustrated in FIGS. 2 and 3, the driving unit 200 is mounted in the main body 130. As illustrated in FIG. 2, the driving unit 200 is mounted in the main body 130 with the driving pin 23 movably engaging with the groove portion 122 of the lifting and lowering mechanism unit 120. The groove portion 122 is a cam groove defined in the driven portion 121 of the lifting and lowering mechanism unit 120. That is, as illustrated in FIG. 2, a cam mechanism includes the driving pin 23, which engages with a groove portion (cam groove) having an undercut shape (U-like shape) defined in the driven portion 121 of the lifting and lowering mechanism unit 120. In such a cam mechanism, driving the driving pin 23 of the driving unit 200 moves the driven portion 121 vertically via the groove portion 122 (cam groove), then moves the lifting and lowering mechanism unit 120 and the operation detector 110 vertically. In this way, the operation device 100 has a configuration in which a predetermined tactile sensation is provided by vibration of the operation detector 110.

Driving Unit 200

As illustrated in FIGS. 2, 3, and 4, the driving unit 200 includes a first gear 10 and a second gear 20. The second gear 20, which meshes with the first gear 10, transmits torque to the first gear 10. At least one of the first gear 10 and the second gear 20 is a fan-type gear. The first gear 10 and the second gear 20 are generally configured including guide portions 12, 22 in a gear rotation direction, respectively, when they are incorporated.

First Gear 10

As illustrated in FIGS. 3 and 4, the first gear 10 is a spur gear and made from resin such as polyoxymethylene/polyacetal (POM). As illustrated in FIG. 2, the first gear 10 is formed as a fan-type gear including tooth portions (tooth projections) 10a at only predetermined range of the circumference of a pitch circle PC1.

An attachment hole 11 is defined in the first gear 10 at the rotation center thereof. The first gear 10 is attached to a motor shaft 51 of a motor 50 through the attachment hole 11. The motor shaft 51 fitted into the attachment hole 11 is integrated with the first gear 10 so that they will not rotate against each other. This configuration allows the first gear 10 to be driven and rotated by rotation of the motor 50.

Second Gear 20

As illustrated in FIGS. 3 and 4, the second gear 20 is a spur gear and made from resin such as polyoxymethylene/polyacetal (POM). As illustrated in FIG. 2, the second gear 20 is formed as a fan-type gear including tooth portions (tooth protrusion) 20a at only predetermined range of the circumference of a pitch circle PC2.

An attachment hole 21 is defined in the second gear 20 at the rotation center. The second gear 20 is attached to a center shaft 70 that is provided upright from an attachment base 30, through the attachment hole 21. The center shaft 70 is rotatably fitted into the attachment hole 21. This configuration allows the second gear 20 to rotate about the attachment hole 21 (center shaft 70).

The first gear 10 and the second gear 20 each have tooth portions formed with the same module. As illustrated in FIG. 4, a distance between center shafts of the first gear 10 and the second gear 20 is substantially set to the sum of $d_1/2$ (half of pitch circle diameter $d_1$) and $d_2/2$ (half of pitch circle diameter $d_2$). As illustrated in FIGS. 3 and 4, this configuration allows the first gear 10 and the second gear 20 to transmit torque with the tooth portions meshing with each other.

The second gear 20 driven by the first gear 10 can drive an object to be driven by the driving pin 23 provided on the second gear 20.

Guide Portion

As illustrated in FIG. 4, the first gear 10 and the second gear 20 are a fan-type gear and incorporated with a specified pair of the teeth in a rotation direction being meshed with each other. As such, the first gear 10 and the second gear 20 include a first guide portion 12 and a second guide portion 22, respectively, as a guide portion for position adjustment in a gear rotation direction during the incorporation of the first gear 10 and the second gear 20.

Attachment Base 30

As illustrated in FIGS. 3 and 4, the attachment base 30 is a base component, which supports the first gear 10 and the second gear 20 via the motor 50, the center shaft 70, and the like, thus constitutes the driving unit 200. For example, the attachment base 30 is formed by pressing stainless steel, a treated steel plate, and the like.

As illustrated in FIG. 2, the attachment base 30 allows the driving unit 200 to be attached to the main body 130. As such, as illustrated in FIG. 3, the attachment base 30 is provided with attachment leg portions 32 on right and left sides. A guide groove 32a and an attachment hole 32b are defined in each of the attachment leg portions 32. The guide groove 32a is a groove for guiding the driving unit 200 to a guide portion 132 described below upon incorporating the driving unit 200 into the main body 130. The attachment hole 32b is a hole for fixing the driving unit 200 to an attachment boss portion 131 of the main body 130.

Torsion Spring 40

As illustrated in FIGS. 3 and 4, a torsion spring 40 is attached to a boss portion 14 of the first gear 10 through a coil portion 41 thereof and applies biasing force on the first gear 10 in a predetermined rotation direction (A direction). The torsion spring 40 is formed from spring steel, stainless steel for a spring, and the like, and includes arm portions 42, 43 extending from both ends of the coil portion 41.

As illustrated in FIG. 3, one arm portion 42 of the torsion spring 40 is locked to a locking portion 61 of a block member 60 fixed to the attachment base 30. The other arm portion 43 is locked to a spring locking portion 13 that is a part of the first gear 10. This configuration allows the first gear 10 to be biased to rotate in the A direction.

Motor 50

As illustrated in FIGS. 3 and 4, the motor 50 is fixed to the attachment base 30 by screws 80, 81 with the motor shaft 51 protruding to the side of a first gear 10. A DC brush motor, a DC brushless motor, or various motors may be utilized as the motor 50.

Block Member 60

As illustrated in FIG. 3, the block member 60 is fixed to the attachment base 30 with the center shaft 70 being inserted into the attachment hole 62 and a leg portion 63 being locked to a cutout portion 31 of the attachment base 30. For example, the block member 60 is formed from resin or the like. The block member 60 limits the movement of the second gear 20 in a direction of the center shaft 70 and prevents the second gear 20 from falling off from the center shaft 70. As described above, the block member 60 is also provided with the locking portion 61 to lock one arm portion 42 of the torsion spring 40. This configuration allows the first gear 10 to be biased to rotate in the A direction from an attachment base 30 side via the torsion spring 40.

Main Body 130

As illustrated in FIGS. 1 and 2, the main body 130 is a box formed from resin. As illustrated in FIG. 1, the main body 130 supports the operation detector 110, and the lifting and lowering mechanism unit 120 in a vertical direction, which is the lifting-and-lowering direction. As illustrated in FIG. 2, the driving unit 200 is attached and fixed to the main body 130 by a predetermined incorporating procedure. The attachment boss portion 131 and the guide portion 132 are formed in the main body 130. The attachment boss portion 131 is a portion for fixing the attachment base 30 at a predetermined vertical position. The guide portion 132 is a portion for movably guiding the driving unit 200 only in a vertical direction during the incorporation of the driving unit 200 into the main body 130.

Method for Manufacturing Operation Device 100

Figure 5A:
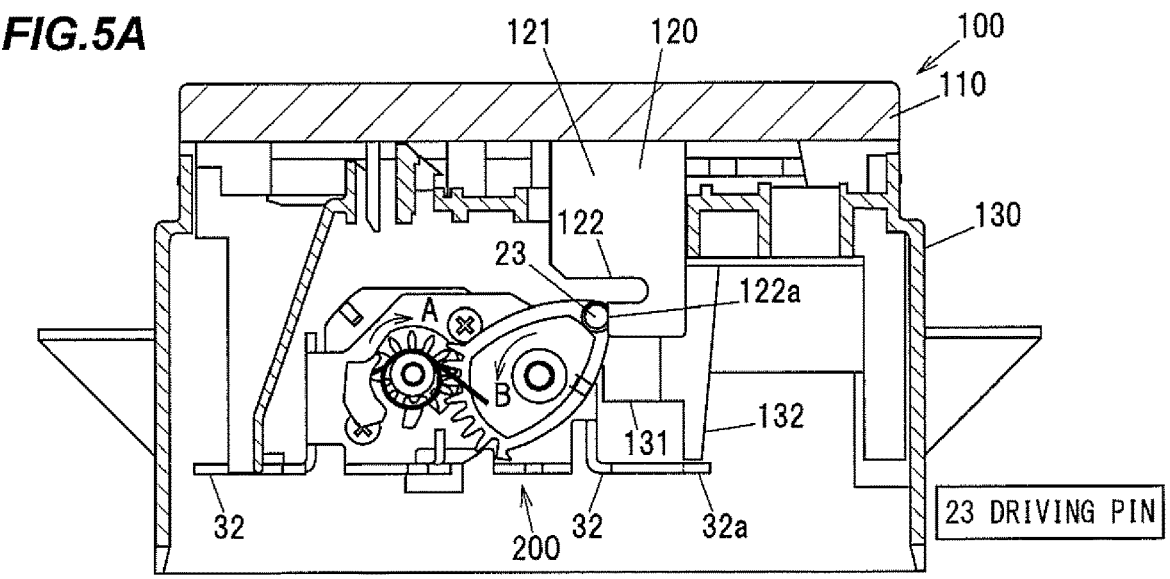
FIGS. 5A to 5C are process charts illustrating incorporation steps during the incorporation of the driving unit into the lifting and lowering mechanism unit.
Figure 5B:
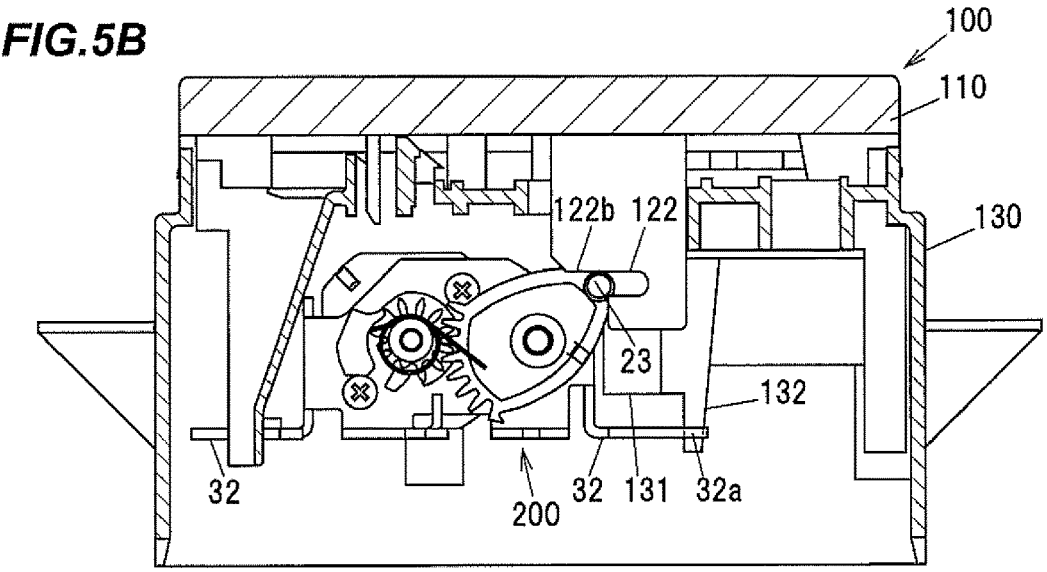
Figure 5C:
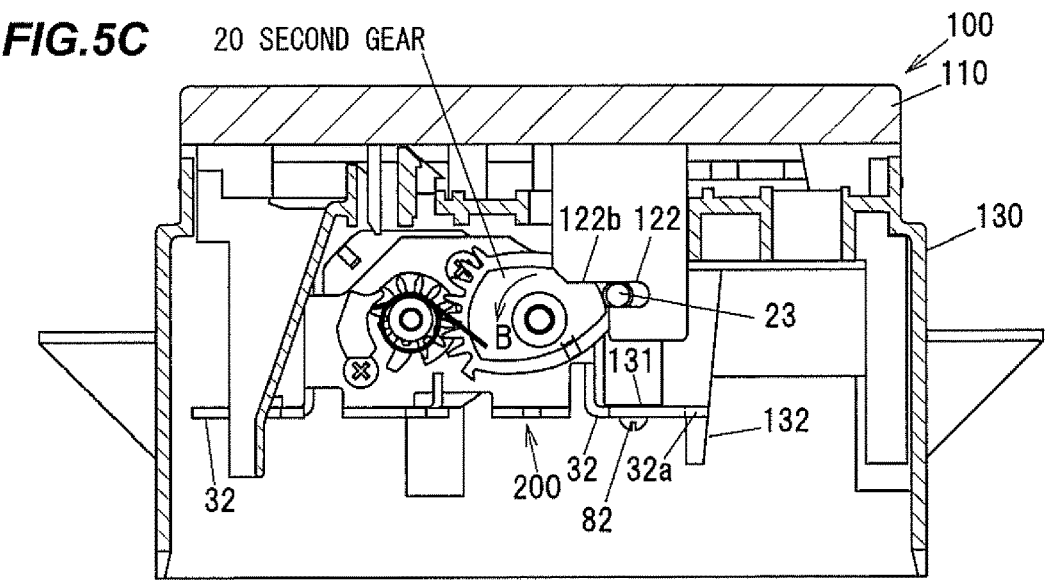

FIGS. 5A to 5C are process charts illustrating incorporation steps during the incorporation of the driving unit into the lifting and lowering mechanism unit.

A method for manufacturing an operation device 100 is configured including the steps of:

(P1) preparing a main body 130, a lifting and lowering mechanism unit 120 movably supported with respect to the main body 130 and including a driven portion 121 configured to receive driving force for movement thereof, and a driving unit 200 attached to the main body 130 and configured to drive the lifting and lowering mechanism unit 120 by a driving pin 23 provided on a rotation gear;

(P2) incorporating, into the main body 130, the lifting and lowering mechanism unit 120 movably supported with respect to the main body 130 and including the driven portion 121 configured to receive driving force for the movement thereof;

(P3) incorporating the driving unit 200 into the lifting and lowering mechanism unit 120 by linear movement of the driving unit 200 with respect to the lifting and lowering mechanism unit 120, and;

(P4) incorporating the driving pin 23 by movement of the driving pin 23 along the groove portion 122 by the rotation gear that is biased to rotate in one direction by the step P3 of incorporating the driving unit so that the driving pin 23 is accommodated in the groove portion 122.

Preparation Step P1

In the preparation step P1, the lifting and lowering mechanism unit 120 provided with the driven portion 121 and the driving unit 200 are prepared. The lifting and lowering mechanism unit 120 is attached to the main body 130. Meanwhile, the driving unit 200 is completed as a unit illustrated in FIGS. 3 and 4. Here, the torsion spring 40 is mounted in the driving unit 200, and the first gear 10 and the second gear 20 are biased to rotate in the A direction and the B direction, respectively. The driving unit 200 is in a fully assembled state as a unit in which the second guide portion 22 comes into contact with a plate face 30a of the attachment base 30.

Lifting and Lowering Mechanism Unit Incorporation Step P2

FIG. 5A is a view illustrating a state in which the driving unit 200 is positioned in the lifting and lowering mechanism unit 120 prepared in the preparation step P1 at the start of the incorporation step. The guide groove 32a of the attachment leg portion 32 of the driving unit 200 is positioned to the guide portion 132 of the main body 130. This allows the driving unit 200 to be incorporated in the upward direction without moving in a right and left direction illustrated in FIG. 5A.

As illustrated in FIG. 5A, the driving pin 23 of the driving unit 200 is in contact with an edge 122a connected to the groove portion 122 of the driven portion 121. The driving pin 23 vertically moves in a linear movement direction along the edge 122a.

Driving Unit Incorporation Step P3

FIG. 5B is a view illustrating a state in which the driving unit 200 is moved upward along the guide portion 132. After the driving unit 200 is moved upward along the guide portion 132, the driving pin 23 comes into contact with an upper surface 122b of the groove portion 122 of the driven portion 121. In this state, the attachment leg portion 32 is not in contact with the attachment boss portion 131. In this state, the second gear 20 is biased to rotate in the B direction and the driving pin 23 provided upright on the second gear 20 is in contact with the upper surface 122b while biased to move to the upper surface 122b.

Driving Pin Incorporation Step P4

FIG. 5C is a view illustrating a state in which the driving unit 200 is further moved upward along the guide portion 132 and the attachment leg portion 32 is in contact with the attachment boss portion 131. From a state illustrated in FIG. 5B to a state illustrated in FIG. 5C, the driving pin 23 is moved along the groove portion 122 and rotates while resisting the force from the second gear 20 whose rotation is biased. And the driving pin 23 is accommodated deep into the groove portion 122. This constitutes a cam mechanism. In the cam mechanism, the driving pin 23 is accommodated in the groove portion 122 of the driven portion 121 at a predetermined position and engaged with the groove portion 122 (cam groove) having an undercut shape (U-like shape) defined in the driven portion 121 of the lifting and lowering mechanism unit 120.

In the above described state, the attachment leg portion 32 is fixed to the attachment boss portion 131 by a screw 82. An operation for incorporation of the driving unit 200 into the lifting and lowering mechanism unit 120 (driven portion 121) is completed by the above described steps P1 to P4.

Effect of Embodiments

According to the embodiment of the present invention, the following effects are achieved:

(1) The operation device according to the present embodiment includes a lifting and lowering mechanism unit 120 and the driving unit 200. The lifting and lowering mechanism unit 120 is movably supported with respect to the main body 130 and includes a driven portion 121 configured to be subject to driving force for movement thereof. The driving unit 200 is attached to the main body 130 and configured to drive the lifting and lowering mechanism unit 120 by a driving pin 23 provided on a rotation gear. The lifting and lowering mechanism unit 120 is configured to include a groove portion 122 in which the driving pin 23 is accommodated into the driven portion 121 by rotation of the rotation gear upon the driving unit 200 being mounted in the main body 130. This requires no diagonal incorporation even if the lifting and lowering mechanism unit 120 has a configuration including a groove portion having an undercut shape (U-like shape).

(2) This eliminates uncertainty in an operation, and difficulty in the incorporation process. Therefore, it is possible to provide an operation device with excellent workability in the case where a driving unit is incorporated into a lifting and lowering mechanism unit, and a method for manufacturing the same.

As is clear from the above description, although a representative embodiment, a modified example, and drawings according to the present invention are exemplified, the scope of the invention according to the patent claims is not limited to the embodiment, modified example, and drawings described above. Accordingly, it should be understood that all combinations of the features described in the embodiment, modified example, and illustrated in the drawings described above are not necessary to solve the problem of the present invention.

What is claimed is:

1. An operation device, comprising:
a main body having an open end on one side;
a lifting and lowering mechanism unit movably supported with respect to the main body and comprising a driven portion configured to receive a driving force for movement of the lifting and lowering mechanism unit toward and away from the open end of the main body;
a driving unit attached to the main body and comprising a rotation gear and a driving pin provided on the rotation gear,
wherein the lifting and lowering mechanism unit comprises a groove portion into which the driving pin is accommodated by moving parallel to a rotational plane of the rotation gear by rotation of the rotation gear when the driving unit is mounted on the main body,
wherein a rotation biasing force is applied continuously to the rotation gear such that the driving pin revolves around an axis of rotation of the rotation gear to bias the lifting and lowering mechanism in a direction toward the open end of the main body,
wherein the groove portion comprises a linear contact surface to allow the driving pin to revolve in a direction opposite to a direction of the rotation biasing force applied continuously to the rotation gear when the driving pin is accommodated into the groove portion such that the lifting and lowering mechanism unit moves in to the main body, and
wherein the rotation gear includes both a toothed portion and an untoothed portion around its outer edge.

2. The device according to claim 1, wherein the main body comprises a guide portion configured to guide the driving unit so as to allow the driving unit to move linearly with respect to the lifting and lowering mechanism unit when the driving unit is installed into the main body.

3. The device according to claim 1, wherein the driving pin slides along the linear contact surface of the groove portion while revolving in a direction opposite to a direction of the rotation biasing force applied continuously to the rotation gear.

4. A method for manufacturing an operation device, comprising:
providing a main body having an open end on one side, a lifting and lowering mechanism unit movably supported with respect to the main body and comprising a driven portion configured to receive driving force for movement of the lifting and lowering mechanism unit toward and away from the open end of the main body, and a driving unit attached to the main body and comprising a rotation gear including both a toothed portion and an untoothed portion around its outer edge, and a driving pin;

installing the lifting and lowering mechanism unit into the main body;

installing the driving unit by linear movement of the driving unit with respect to the lifting and lowering mechanism unit; and installing the driving pin by movement of the driving pin in a direction parallel to a rotation plane of the rotation gear along a groove portion of the lifting and lowering mechanism unit by the rotation gear that is biased to rotate in one direction such that the driving pin is accommodated in the groove portion, wherein a rotation biasing force is applied continuously to the rotation gear such that the driving pin revolves around an axis of rotation of the rotation gear to bias the lifting and lowering mechanism unit in a direction toward the open end of the main body, and wherein the groove portion comprises a linear contact surface to allow the driving pin to revolve in a direction opposite to a direction of the rotation biasing force applied continuously to the rotation gear when the driving pin is accommodated into the groove portion such that the lifting and lowering mechanism unit moves in to the main body.

5. The method according to claim 4, wherein the main body comprises a guide portion configured to guide the driving unit so as to allow the driving unit to move linearly with respect to the lifting and lowering mechanism unit in the installing of the lifting and lowering mechanism unit.

6. The device according to claim 4, wherein the driving pin slides along the linear contact surface of the groove portion while revolving in a direction opposite to a direction of the rotation biasing force applied continuously to the rotation gear.

7. The device according to claim 1, wherein the drive pin is located adjacent to the untoothed portion of the rotation gear.

8. The device according to claim 4, wherein the drive pin is located adjacent to the untoothed portion of the rotation gear.

9. An operation device, comprising:

a main body having an open end on one side, and a tactile operation detector for receiving fingertips of an operator on a side opposite to the one side;

a lifting and lowering mechanism unit movably supported with respect to the main body and comprising a driven portion configured to receive a driving force for movement of the lifting and lowering mechanism unit toward and away from the open end of the main body;

a driving unit attached to the main body and comprising a rotation gear and a driving pin provided on the rotation gear, wherein the lifting and lowering mechanism unit comprises a groove portion into which the driving pin is accommodated by moving parallel to a rotational plane of the rotation gear by rotation of the rotation gear when the driving unit is mounted on the main body, wherein a rotation biasing force is applied continuously to the rotation gear such that the driving pin revolves around an axis of rotation of the rotation gear to bias the lifting and lowering mechanism in a direction toward the open end of the main body, wherein the groove portion comprises a linear contact surface to allow the driving pin to revolve in a direction opposite to a direction of the rotation biasing force applied continuously to the rotation gear when the driving pin is accommodated into the groove portion such that the lifting and lowering mechanism unit moves in to the main body, and wherein the driving unit is configured to provide a vibration to the tactile operation detector to provide a tactile sensation to the fingertips of the operator.

* * * * *